United States Patent
Soni et al.

(10) Patent No.: US 9,710,449 B2
(45) Date of Patent: Jul. 18, 2017

(54) TARGETED SOCIAL CAMPAIGNING BASED ON USER SENTIMENT ON COMPETITORS' WEBPAGES

(71) Applicant: ADOBE SYSTEMS INCORPORATED, San Jose, CA (US)

(72) Inventors: Sachin Soni, New Delhi (IN); Anmol Dhawan, Ghaziabad (IN); Ashish Duggal, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 467 days.

(21) Appl. No.: 14/310,213

(22) Filed: Jun. 20, 2014

(65) Prior Publication Data

US 2015/0371278 A1 Dec. 24, 2015

(51) Int. Cl.
  *G06F 17/30* (2006.01)
  *G06F 17/27* (2006.01)
  *G06Q 30/02* (2012.01)
  *G06Q 50/00* (2012.01)

(52) U.S. Cl.
  CPC ......... *G06F 17/27* (2013.01); *G06Q 30/0269* (2013.01); *G06Q 50/01* (2013.01)

(58) Field of Classification Search
  None
  See application file for complete search history.

(56) References Cited

U.S. PATENT DOCUMENTS

| | | | | |
|---|---|---|---|---|
| 2009/0198654 A1* | 8/2009 | Surendran | ......... | G06F 17/30616 |
| 2009/0248484 A1* | 10/2009 | Surendran | .......... | G06Q 30/0201 705/7.29 |
| 2009/0276419 A1* | 11/2009 | Jones | ................ | G06F 17/30637 |
| 2010/0332313 A1* | 12/2010 | Miller | ............... | G06F 17/30867 705/14.44 |
| 2013/0006760 A1* | 1/2013 | Brenner | ................ | G06Q 30/02 705/14.49 |
| 2013/0218682 A1* | 8/2013 | Alterman | ............... | G06Q 10/00 705/14.58 |
| 2015/0032675 A1* | 1/2015 | Huehn | ................... | G06Q 50/01 706/12 |
| 2015/0058118 A1* | 2/2015 | Clurman | ............ | G06Q 30/0251 705/14.49 |
| 2015/0073774 A1* | 3/2015 | Becker | ................ | G06F 17/2735 704/9 |

* cited by examiner

*Primary Examiner* — Richard Bowen
(74) *Attorney, Agent, or Firm* — Shook, Hardy & Bacon L.L.P.

(57) ABSTRACT

Automatic social campaigning is provided based on the user sentiment in user posts on competitor webpages. User posts on competitor webpages are analyzed to determine the user sentiment of the posts. Promotional messages promoting a product or service of a company are generated and provided to the users based on the user sentiment. In some instances, promotional messages may only be generated and provided for user posts with negative sentiment. The content of the promotional messages may also be selected based on the user sentiment.

16 Claims, 4 Drawing Sheets

TARGETED SOCIAL CAMPAIGNING BASED ON USER SENTIMENT ON COMPETITORS' WEBPAGES

BACKGROUND

Social networking has become an increasingly popular presence on the Internet. Social network services allow users to easily connect with friends, family members, and other users in order to share, among other things, comments regarding activities, interests, and other thoughts. As social networking has continued to grow, companies have recognized value in the technology. For instance, companies have found that social networking provides a great tool for managing their brand and driving consumers to their own web sites or to otherwise purchase their products or services.

To assist companies in their social networking efforts, some social analysis tools, such as the ADOBE SOCIAL tool, have been developed that provide mechanisms for companies to collect information regarding what consumers are saying and manage responses to consumers' social networking messages. Using such social analysis tools, companies can target consumers with posts promoting their products and services. While this presents a powerful way to reach consumers, it has proven difficult to effectively identify which consumers to target, when to target each consumer, and what message to send to each consumer.

Some social analysis tools also allow companies to analyze competitors' webpages. For instance, companies may be able to view how the FACEBOOK webpages of their competitors compare to their own FACEBOOK webpages. This may provide several metrics, such as total page likes, new page likes, post engagements, new posts, and other information during some specified timeframe. While this information is useful to companies, the information is often basic, and companies are limited in what they can do with the information.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing automatic social campaigning promoting a company's product or services based on the user sentiment of user posts on competitor webpages. A user post on a competitor's webpage is analyzed to determine the user sentiment of the post. This may include, for instance, identifying the user sentiment of the user post as negative, neutral, or positive. A promotional message is generated based on the user sentiment and delivered to the user who submitted the user post. In some instances, a promotional message may only be generated and delivered to a user if the user sentiment is negative. The content of the promotional message may also be selected based on the user sentiment in the user post. This may include identifying a subject of user sentiment in the user post and generating the promotional message to include content that addresses the subject of the user sentiment.

BRIEF DESCRIPTION OF THE DRAWINGS

The present invention is described in detail below with reference to the attached drawing figures, wherein.

DETAILED DESCRIPTION

Figure 1:
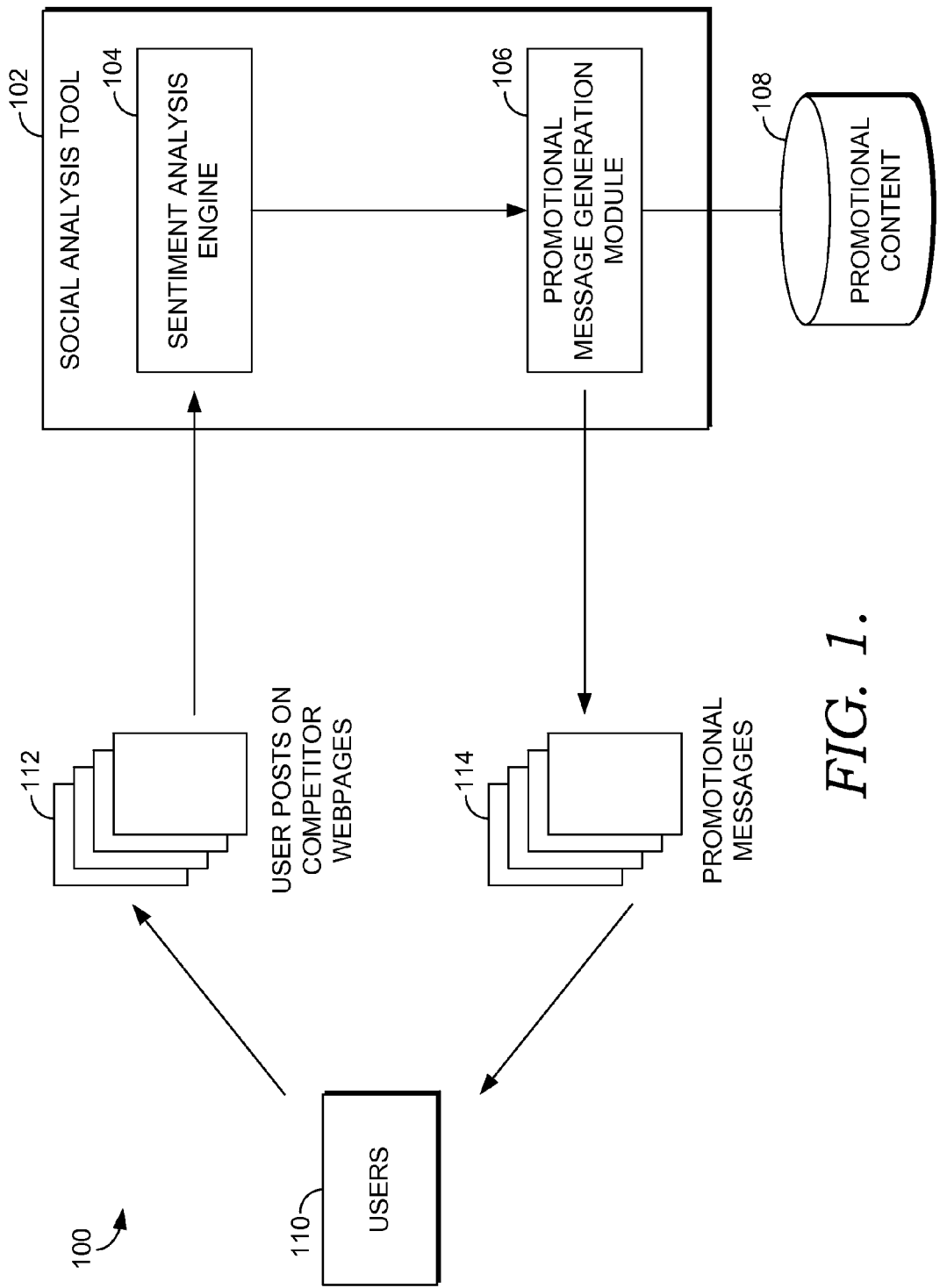
FIG. 1 is a block diagram showing a system for providing automatic social campaigning for a company based on the user sentiment in user posts on competitors' webpages in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to providing automatic social campaigning for a company based on user sentiment in posts on competitors' webpages. A company includes any entity promoting a product or service, and a competitor of the company includes any entity promoting a competing product or service. User posts on competitor webpages are tracked, for instance, using a social analysis tool. A competitor webpage includes any publicly available electronic resource associated with a competitor at which a user may post a comment. This may include, for instance, resources associated with social network services such as the TWITTER, FACEBOOK, LINKEDIN, TUMBLR, and YOUTUBE services, to name a few. In one embodiment, a competitor webpage does not include an electronic resource of the company or an electronic resource that is not associated with any competitor products or services. Therefore, such embodiment will not include any analysis of webpages that are not associated with any competitor products or services. In some instances, the competitor webpages may be manually identified by the company or on behalf of the company. In another embodiment, any webpage can be included for analysis.

The user posts on competitor webpages are analyzed to detect the user sentiment using known sentiment analysis techniques. The user sentiment generally represents the attitude of the user who wrote the post. In some instances, the user sentiment analysis determines that a user post is positive, neutral, or negative. Promotional messages promoting the company's products or services are automatically generated based on the user sentiment and sent to the users who submitted the user posts on the competitors' webpages.

For example, a promotional message may be automatically generated by creating a message that compares features of the company's product or service against features of the competitor's product or service, or a promotional message may be automatically generated by identifying the subject of user sentiment in a user's post and generating a promotional message addressing that subject.

In some embodiments, the identification of which users to target with promotional messages and when to target the users is based on the user sentiment in user posts. In particular, some embodiments are directed to targeting users who submit negative user posts on competitors' webpages. This recognizes that a user submitting a negative user post on a competitor's webpage is likely dissatisfied with the competitor and therefore presents an opportunity for the company to target that user with a promotional message.

Further embodiments are directed to automatically selecting the content to include in promotional messages based on the user sentiment in the user posts on competitors' webpages. For instance, negative user posts may be analyzed to identify a subject of the negative sentiment. The specificity of the subject of the negative sentiment may range from a broad identification of the type of product or service being discussed to a narrow identification of a feature of a product or service being discussed. The promotional message may then be automatically generated to include content that addresses the subject of the negative sentiment. In instances in which a promotional message is provided in response to a neutral or positive user post, the promotional message may be a generic message. For instance, a promotional message may be provided that highlights benefits of the company's product or service over the competitor's product or service.

By sending promotional messages to users who submit negative user posts on competitors' webpages, embodiments of the present invention enable companies to effectively target users at the right time and tackle competition in a very effective way. Additionally, selecting the content of promotional messages based on the user sentiment in user posts provides an opportunity to appropriately tailor messages to users. Ultimately, a company may be able to achieve better conversion rates by effectively targeting the right user with the right message at the right time.

Accordingly, in one aspect, an embodiment of the present invention is directed to a non-transitory computer storage medium comprising computer-useable instructions that, when used by one or more computing devices, cause the one or more computing devices to perform operations. The operations include automatically generating a promotional message promoting a product or service of a company based on a user sentiment in a post by a user on a competitor's webpage. The operations also include providing the promotional message for presentation to the user.

In another embodiment of the invention, an aspect is directed to a computer-implemented method. The method includes identifying, by a first computing process, a post by a user with negative user sentiment on a competitor's webpage. The method also includes determining, by a second computing process, a subject of the negative user sentiment in the post. The method further includes generating, by a third computing process, a promotional message promoting a product or service of a company based on the subject of the negative user sentiment. The method further includes providing, by a fourth computing process, the promotional message for presentation to the user. The first, second, third, and fourth computing process are performed by one or more computing devices.

A further embodiment is directed to a computerized system comprising: one or more processors; and one or more computer storage media storing computer-useable instructions that, when used by the one or more processors, cause the one or more processors to: determine a user sentiment of a post by a user on a first competitor's webpage; if the user sentiment is above a threshold, provide a generic promotional message promoting a product or service of a company; and if the user sentiment is below a threshold, determine a subject of negative sentiment in the post, generate a targeted promotional message that includes information corresponding with the subject of the negative sentiment, and provide the targeted promotional message for presentation to the user.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 includes a social analysis tool 102 that is configured to, among other things, provide automatic social campaigning for a company based on the user sentiment in user posts 112 submitted by users 110 on competitors' webpages. The social analysis tool 102 may be implemented via any type of computing device, such as computing device 500 described below with reference to FIG. 5, for example. The social analysis tool 102 may be implemented on a single device or multiple devices cooperating in a distributed environment.

The company may identify a number of competitor webpages for the social analysis tool 102 to track. Webpages may be identified for any number of competitors. As noted previously, a competitor webpage includes any publicly available electronic resource associated with a competitor at which a user may post a comment. Based on the identified competitor webpages, the social analysis tool 102 collects user posts 112 on those competitor webpages to determine whether to respond to the users 110 who submitted the user posts 112 with promotional messages.

As shown in FIG. 1, the social analysis tool 102 includes, among other things, a sentiment analysis engine 104 and a promotional message generation module 106. The sentiment analysis engine 104 generally operates to analyze the text of user posts 112 submitted by users 110 on competitor webpages to determine the user sentiment of the posts. Any of a variety of known sentiment analysis techniques may be employed by the sentiment analysis engine 104. For instance, the text of user posts may be analyzed using natural language processing to assess the sentiment of the posts. Since such sentiment analysis techniques are known, they will not be discussed in further detail herein.

The sentiment analysis generally determines a sentiment score for a user post that reflects the sentiment of the user based on the text within the post. In some instances, the sentiment analysis engine 104 identifies the user post as negative, neutral, or positive based on the sentiment score. For instance, if the sentiment score for a user post is below a first threshold, the user sentiment is considered to be negative; if the sentiment score is above a second threshold, the user sentiment is considered to be positive; and if the sentiment score is between the first and second threshold, the sentiment is considered to be neutral. In some embodiments, a single threshold may be employed, and the sentiment is either positive or negative depending on whether the sentiment score is above or below the threshold.

The promotional message generation module 106 operates to automatically generate promotional messages 114 based on the user sentiment in the user posts 112. The promotional messages 114 are then delivered to the users 110 who submitted the user posts 112. Each promotional message may correspond with a particular user post and may be delivered to the user who submitted that user post. The promotional messages 114 may take any of a variety of different forms. A promotional message may be provided within the confines of a social networking service, such as, for example, a reply to the user post, a general post within the user's social networking account, or a promoted post within the user's social networking account (e.g., a promoted post delivered via the user's FACEBOOK account, or a promoted tweet delivered via a user's TWITTER account). A promotional message could be provided outside the confines of a social networking service, such as, for example, an advertisement within an email, or an advertisement dynamically placed on a webpage visited by the user.

Promotional messages are automatically generated based on user sentiment in a variety of different manners in accordance with various embodiments of the present invention. In some instances, the user sentiment dictates whether a promotional message is generated for a given user post and sent to the user who submitted the user post. In particular, some embodiments are directed to targeting only users who submit negative user posts on competitor webpages. In such embodiments, a promotional message is generated for a user post only if the user sentiment of the user post is determined to be negative (e.g., below a configurable threshold score).

By way of example to illustrate, suppose a user submits a post indicating: "Brand X has the WORST cameras I've ever owned. I've had two of them and they had the same issues. Just a few days after the warranty ran out, they won't stay on. The cameras are garbage." It's clear from this post the user doesn't like the competitor and describes its cameras as being the worst. This presents an opportunity for the company. By analyzing the user post, the sentiment analysis engine 104 determines the negative user sentiment contained in the user post. Based on the negative user sentiment, the promotional message generation module 106 generates a promotional message promoting the company's camera and sends the promotional message to the user.

In further instances, the content of promotional messages is selected based on the user sentiment. As shown in FIG. 1, the promotional message generation module 106 has access to a promotional content data store 108, which contains different promotional content that may be included in promotional messages. A company may provide the promotional content stored in the promotional content data store 108. The promotional content provided by a company may vary. In some instances, the company may provide specific promotional messages that are sent to users without any further processing or manipulation. For example, the promotional messages may include a description of the company's product/service or may provide a comparison of the company's product/service with a competitor's product/service. In other instances, the company may provide product/service information that may be processed to select particular content for automatically generating a promotional message for responding to a given user post. For example, the company may provide information describing different features of the company's product/service. As a more specific example, suppose the product is a mobile phone. The product information may be the size of the screen, the screen resolution, the type of processor, the amount of RAM, the number of megapixels of the camera on the device, etc. If product/service information is submitted, the information may be processed (e.g., using natural language processing) to tag the information so that appropriate information may be selected when generating a promotional message. Accordingly, the promotional message generation module 106 may select from the product/service information to automatically generate a promotional message that is specifically tailored to a particular user post, for instance, highlighting a particular feature of the product/service.

In some instances, if the user sentiment is determined to be negative, the user post is analyzed to identify the subject of the negative user sentiment (i.e., what the user is negative about). Known sentiment analysis techniques may be employed to determine the subject of the negative user sentiment. By way of example and not limitation, this may include detecting, extracting, and weighting sentence affect and sentiment signal using a general purpose sentiment vocabulary combined with a natural language processing engine. Part of speech and noun expression/verb expression tagged sentences may be used as input to determine and score positive, negative, and/or neutral sentiment.

In some instances, the user may be discussing a product or service generally, and the analysis identifies the product or service as the subject of the negative user sentiment. For example, the user may be discussing a mobile phone, which is identified as the subject of negative user sentiment. In other instances, the user may be discussing a particular feature of a product or service, and the analysis may identify the feature as the subject of the negative user sentiment. For example, the user may be discussing the camera on a mobile phone, and the camera (i.e., a feature of the phones) is identifier as the subject of the negative user sentiment. The content of the promotional message is then selected based on the subject of the negative user sentiment to better target the message. In particular, if a user is negative about a particular product, service, or feature of the product or service, the promotional message is tailored based on whatever it is the user is negative about.

As an example to illustrate, suppose a user submitted a post that indicated: "Played with Brand X mobile phone. Camera not that great :-(" The sentiment analysis engine 104 analyzes the user post to determine the user post is negative. Additionally, the sentiment analysis engine 104 identifies the camera on the mobile phone as the subject of the negative comment. Based on this identification, the promotional message generation module 106 selects content describing the camera on the company's mobile phone (e.g., Brand A mobile phone) for inclusion in a promotional message to send to the user. For example, the statement "13 MP Autofocus camera" may be selected from the promotional content and overlaid on a promoted post that is then sent to the user. As such, the promoted post may provide a simple message, such as: "Brand A mobile phone includes a 13 MP Autofocus camera." In some instances, a more robust message is generated that reflects the negative user sentiment from the user post as well as the selected feature, such as: "Fed up of using a mobile phone with a camera which is not great and offers low MP? Then try the 13 MP Autofocus camera on the Brand A mobile phone."

In instances in which a promotional message is provided for a neutral or positive user post, a generic promotional message may be delivered to the user. The generic promotional message may generally promote the company's product or service, or the promotional message may compare the company's product or service with the competitor's product or service. As an example to illustrate, suppose a user submits a user post that indicates: "I am thinking about getting a Brand X camera for $425. But they have the other Brand X camera for $499. Which one should I get? I am doing still photography but I am going to also shoot a movie." In this instance, the user wants to buy the competitor's product. This may be a lost opportunity if the user is not targeted appropriately. Therefore, the promotional message sent to the user may compare the company's camera with the competitor's camera highlighting benefits of the company's camera, thereby trying to alter the user's decision.

Figure 2:
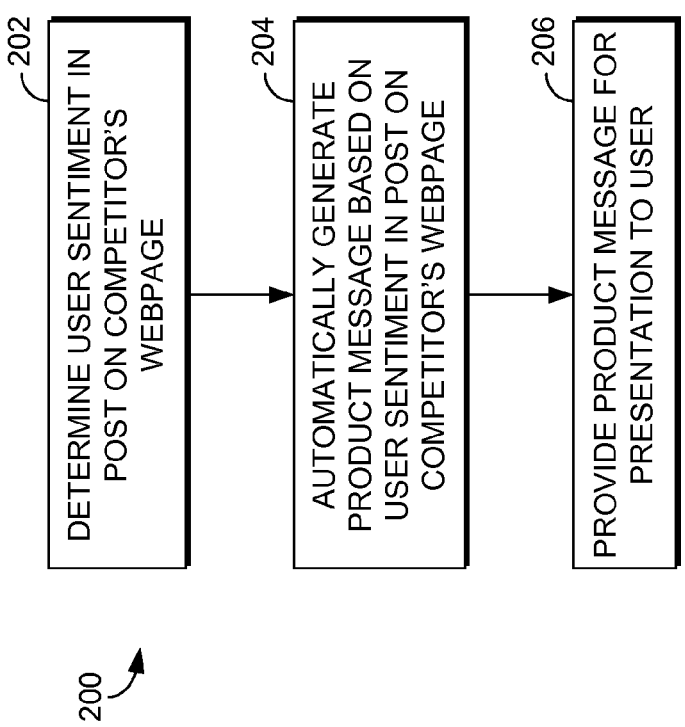
FIG. 2 is a flow diagram showing a method for automatically providing a promotional message to a user based on the user sentiment of a user post on a competitor's webpage in accordance with an embodiment of the present invention.

With reference now to FIG. 2, a flow diagram is provided that illustrates an overall method 200 for automatically providing a promotional message to a user based on the user sentiment of a user post on a competitor's webpage in accordance with an embodiment of the present invention. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of a social analysis tool, such as the ADOBE SOCIAL tool.

As shown at block 202, a user post on a competitor's webpage is analyzed to determine the user sentiment of the post. For instance, using a social analysis tool, such as the ADOBE SOCIAL tool, specific competitor webpages can be specified by or on behalf of a company. The competitor webpages could be identified by URL and may include individual webpages and/or websites (i.e., a collection of webpages within a common web domain). Those competitor webpages are tracked to identify user posts. Any identified user post is then analyzed, for instance, by the sentiment analysis engine 104 of FIG. 1. This analysis may include generating a sentiment score for the user post and/or classifying the user sentiment as negative, neutral, or positive.

A promotional message that promotes a product or service of the company is automatically generated based on the user sentiment of the user post, as shown at block 204 (e.g., by the promotional message generation module 106 of FIG. 1). In some instances, the promotional message may be automatically generated by automatically retrieving a pre-configured message. One or more pre-configured messages may be specified by or on behalf of the company and stored for use in providing promotional messages. Based on the user sentiment of the user post, one of these pre-configured messages may be selected. For example, a company may provide a pre-configured message and indicate that the message is intended to be used in response to negative user posts. As such, if the user post is determined to have a negative user sentiment at block 202, that pre-configured message would be automatically retrieved at block 204 to generate a promotional message.

In other instances, the promotional message may be automatically generated by automatically assembling the content of the message based on the user sentiment. Information regarding features of a company's product or service may be provided by or on behalf of the company. That information may be tagged with metadata describing the information. When analysis of the user sentiment of the user post identifies a particular subject of the user sentiment, certain pieces of information that correspond with that subject may be identified based on the tagged metadata, and that information may be used to assemble the message. For instance, a message template may be provided that allows for the insertion of selected information to generate the message. Natural language processing and/or spoken language understanding techniques may also be employed in the process of generating the promotional message.

The promotional message is provided for presentation to the user who submitted the user post, as shown at block 206. The promotional message may be delivered to the user in any of a variety of different manners in accordance with embodiments of the present invention. In some embodiments, the promotional message is automatically sent to the user without any human intervention. In other embodiments, the promotional message is presented to an employee at the company (e.g., a moderator) prior to sending the message to the user. This allows the moderator to review the promotional message, modify the content of the message, and/or to determine whether to send the promotional message. The moderator may also be able to review the user post in conjunction with the promotional message to help the moderator in determining whether to modify the promotional message and/or whether to send the promotional message to the user.

Figure 3:
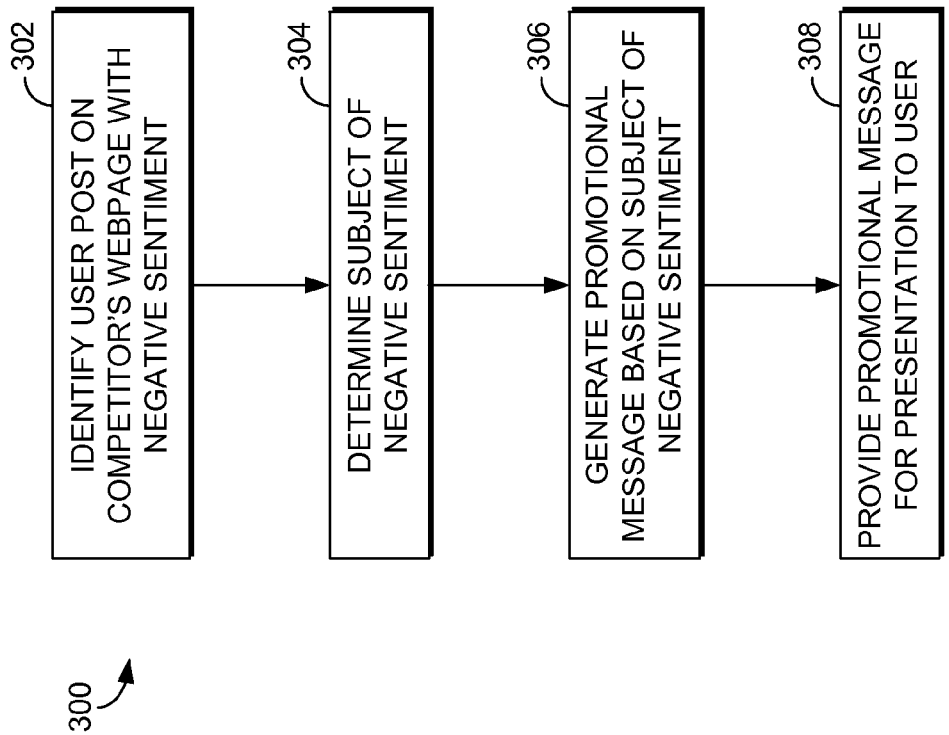
FIG. 3 is a flow diagram showing a method for targeting a user who submitted a negative user post on a competitor's webpage in accordance with an embodiment of the present invention.

As noted previously, some embodiments are directed to targeting only users who submit negative user posts on competitors' webpages, recognizing that a user who is dissatisfied with a competitor presents an opportunity for a company. With reference now to FIG. 3, a flow diagram is provided that illustrates a method 300 for targeting a user who submitted a negative user post on a competitor's webpage in accordance with an embodiments of the present invention.

As shown at block 302, a user post on competitor's webpage is identified as having a negative user sentiment. For instance, the sentiment analysis engine 104 of FIG. 1 may analyze the user post to identify the negative user sentiment. This analysis may include generating a sentiment score for the user post and determining the user sentiment is negative based on the sentiment score being below a particular threshold score.

A subject of the negative sentiment is determined as shown at block 304. For instance, the sentiment analysis engine 104 of FIG. 1 may analyze the text of the user post to determine what the user is negative about. In some instances, the user may be negative about a product or service generally. For example, suppose a user submits a user post that indicates: "I don't like Brand X camera. They're junk." In this instance, the subject of the user post is a camera generally. In other instances, the user may be negative about a particular feature (or features) of a product or service. For example, suppose a user submits a user post that indicates: "I've already sent my Brand X camera in for back focusing problems." Here, the user is negative about a particular product feature—the back focusing on the competitor's camera.

A promotional message is automatically generated based on the subject of the negative user sentiment, as shown at block 306. For instance, the promotional message generation module 106 of FIG. 1 may generate the promotional message based on the subject of the negative user sentiment. If the subject of the negative user sentiment is a competitor product/service generally, the promotional message may contain general information on the company's product/service. For example, continuing the first example above in which the user post is negative about a competitor's camera generally, a promotional message may be generated that highlights benefits of the company's camera generally. Alternatively, if the subject of the negative user sentiment is a feature of the competitor's product/service, the promotional message may highlight that feature on the company's product/service. For example, continuing the second example above in which the user post complains about a back focusing problem on a competitor's camera, a promotional message may be generated that highlights the back focusing support on the company's camera. The generated promotional message is then sent to the user who submitted the post, as shown at block 308 (with or without first getting any modifications/approval from a moderator).

Figure 4:
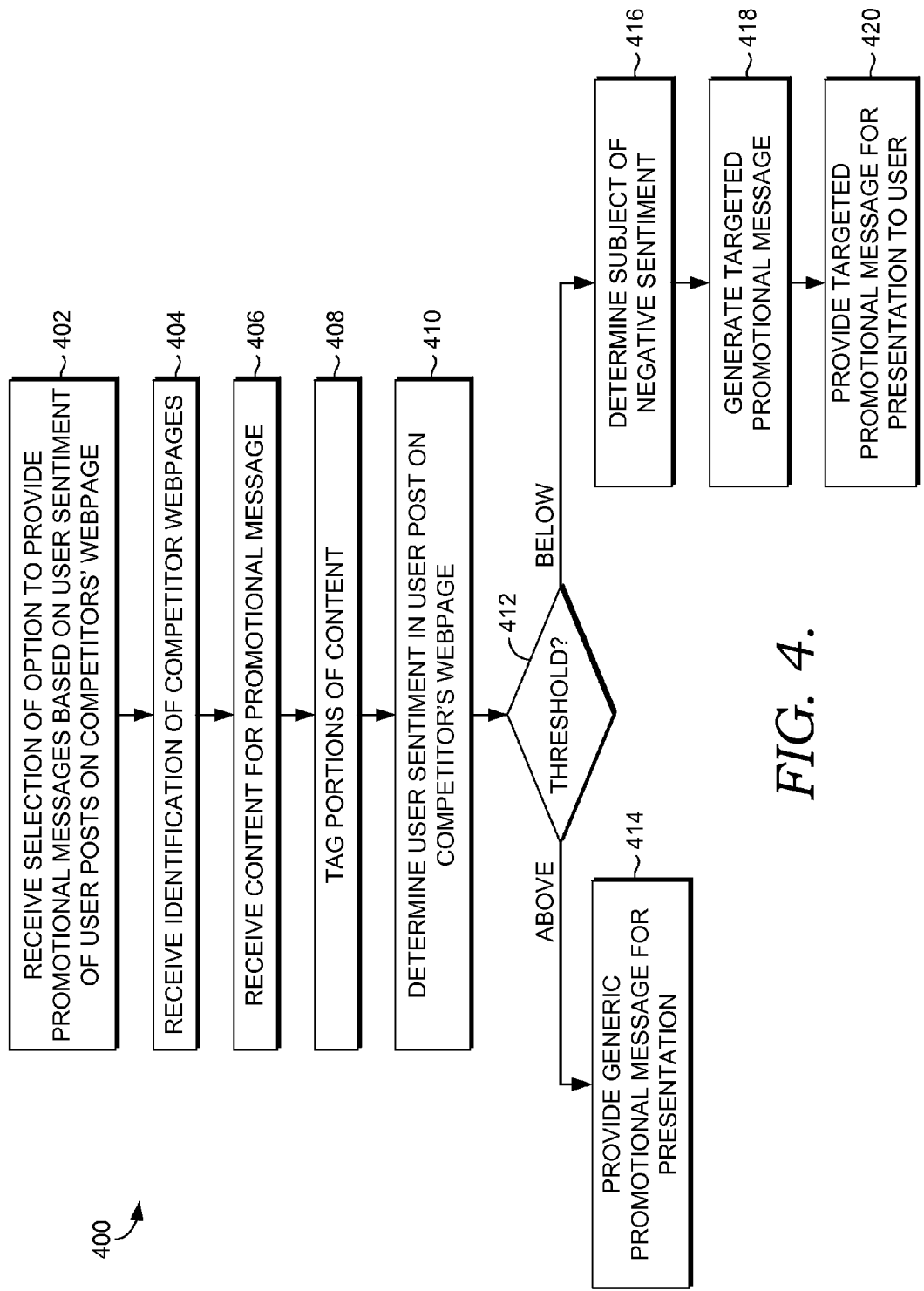
FIG. 4 is a flow diagram showing a method for providing a promotional message based on the user sentiment of a user post on a competitor's webpage in accordance with an embodiment of the present invention.

Turning to FIG. 4, a flow diagram is provided that illustrates a method for providing a promotional message based on the user sentiment of a user post on a competitor's webpage. As shown at block 402, a company initially selects an option in a social analysis tool (e.g., the social analysis tool 102 of FIG. 1) to provide promotional messages based on user sentiment of user posts on competitors' webpages. In conjunction with the option selection, the company identifies competitor webpages to track, as shown at block 404. Alternatively, the competitors may be determined on behalf of the company. The company may also provide promotional content for promotional messages, as shown at block 406. The promotional content may include specific promotional messages that may be sent to users without any further processing or manipulation. The promotional content may include information describing features of the company's product or service that allows for a promotional message to be dynamically generated by pulling information from the promotional content. In embodiments in which the promotional content is product/service information, the information may be analyzed to tag different portions of the information to facilitate dynamically generating promotional messages with the appropriate content, as shown at block 408.

The user sentiment of a user post on a competitor's webpage is determined, as shown at block 410. For instance, the sentiment analysis engine 104 of FIG. 1 may analyze the user post to determine the user sentiment. This may include determining a user sentiment score and/or determining a user sentiment as negative, neutral, or positive. As shown at block 412, a determination is made regarding whether the user sentiment is above or below a threshold. This may include determining a user sentiment score is above or below a certain threshold score or may include identifying the user sentiment as either neutral/positive or negative.

If the user sentiment is above the threshold (e.g., a user sentiment score is above a threshold score or the user sentiment is neutral or positive), a generic promotional message is provided for presentation to the user who submitted the user post, as shown at block 414. For instance, the promotional message generation component 106 of FIG. 1 may generate the generic promotional message, which is then delivered to the user who submitted the user post. The generic message may provide information regarding the company's product/service or may compare the company's product/service with the competitor's product/service.

Alternatively, if the user sentiment is below the threshold (e.g., a user sentiment score is below a threshold score or the user sentiment is negative), the subject of the negative user sentiment is determined, as shown at block 416 (e.g., by the sentiment analysis engine 104 of FIG. 1). The subject of the negative user sentiment may be a general type of product/service or a specific feature (or multiple features) of a product/service. A promotional message is generated based on the subject of the negative sentiment, as shown at block 418 (e.g., by the promotional message generation component 106 of FIG. 1). If the subject of the negative sentiment is a general type of product/service, a promotional message that generally promotes the company's product or service may be generated. If the subject of the negative sentiment is a specific feature, a promotional message may be generated that highlights the feature in the company's product or service. The promotional message is provided for presentation to the user who submitted the post, as shown at block 420 (with or without first getting any modifications/approval from a moderator).

Figure 5:
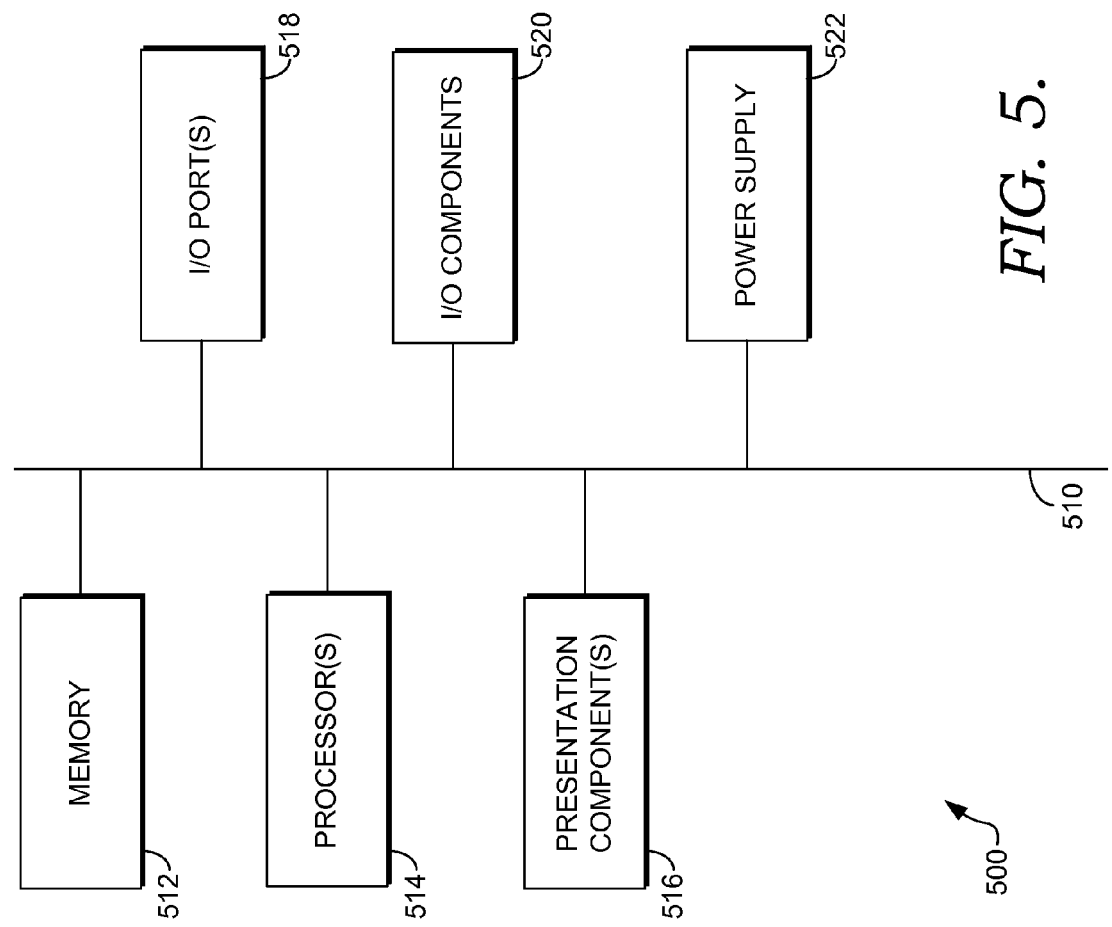
FIG. 5 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present invention provide automatic social campaigning based on the user sentiment of user posts on competitor webpages. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to automatically generate a promotional message for a company in response to a post by a user on a competitor's webpage, the operations comprising:
   employing sentiment analysis to determine a user sentiment in the post and to identify a feature of a product or service of the competitor discussed in the post as a subject of the user sentiment;
   automatically generating the promotional message promoting the product or service of the company by:
      retrieving, from a promotional content data store, information tagged with metadata corresponding with the feature of the product or service identified as the subject of the user sentiment, the information describing a feature of a product or service of the company corresponding to the feature of the product or service of the competitor, and
      assembling content of the promotional message from the information retrieved from the promotional content data store; and
   electronically communicating the promotional message for presentation to the user on a user device in response to the post.

2. The one or more computer storage media of claim 1, wherein the promotional message is provided as a reply to the user post, a general post delivered via the user's social networking service account, or a promoted post delivered via the user's social networking service account.

3. The one or more computer storage media of claim 1, wherein the promotional message is generated in response to determining the user sentiment is negative.

4. The one or more computer storage media of claim 1, wherein the operations further comprise:
   presenting the promotional message to a moderator; and
   receiving an approval of the promotional message by the moderator prior to providing the promotional message for presentation to the user.

5. The one or more computer storage media of claim 1, wherein the user sentiment is neutral or positive.

6. The one or more computer storage media of claim 5, wherein automatically generating the promotional message comprises including information comparing the product or service of the company with the competitor's product or service based on the user sentiment being neutral or positive.

7. The one or more computer storage media of claim 1, wherein automatically generating the promotional message promoting the product or service of the company by assembling the content of the promotional message from the information retrieved from the promotional content data store comprises inserting the information into a message template to generate the promotional message.

8. The one or more computer storage media of claim 1, wherein automatically generating the promotional message promoting the product or service of the company by assembling the content of the promotional message from the information retrieved from the promotional content data store comprises employing natural language processing and/or spoken language understanding to generate the promotional message from the information.

9. A computer-implemented method to automatically generate a promotional message for a company, the method comprising:
identifying, by a first computing process, a post by a user with negative user sentiment on a competitor's webpage;
identifying, by a second computing process, a feature of a product or service of the competitor discussed in the post as a subject of the negative user sentiment in the post;
automatically generating, by a third computing process, the promotional message promoting a product or service of a company based on the subject of the negative user sentiment by:
retrieving, from a promotional content data store, information tagged with metadata corresponding with the feature of the product or service identified as the subject of the negative user sentiment, the information describing a feature of a product or service of the company corresponding to the feature of the product or service of the competitor, and
assembling content of the promotional message from the information retrieved from the promotional content data store; and
electronically communicating, by a fourth computing process, the promotional message for presentation to the user on a user device in response to the post;
wherein the first, second, third, and fourth computing processes are performed by one or more computing devices.

10. The method of claim 9, wherein identifying the post by the user with negative user sentiment comprises:
calculating a user sentiment score for the post; and
identifying the post as having the negative user sentiment based on the user sentiment score for the post being below a threshold score.

11. A computerized system comprising:
one or more processors; and
one or more computer storage media storing computer-useable instructions that, when used by the one or more processors, cause the one or more processors to:
employ sentiment analysis to determine a user sentiment of a post by a user on a competitor's webpage;
when the user sentiment is above a sentiment threshold indicating the user sentiment is neutral or positive:
retrieve a pre-existing promotional message promoting a product or service of a company, and
electronically communicate the pre-existing promotional message for presentation to the user on a user device in response to the post; and
when the user sentiment is below a threshold indicating the user sentiment is negative:
determine a subject of negative sentiment in the post as a feature of a product or service of a competitor,
automatically generate a targeted promotional message that includes information corresponding with the subject of the negative sentiment by retrieving information tagged with metadata corresponding with the feature of the product or service and assembling content of the targeted promotional message from the retrieved information, and
electronically communicate the targeted promotional message for presentation to the user on a user device in response to the post.

12. The computerized system of claim 11, wherein the user sentiment is above or below the threshold if a user sentiment score for the post is above or below a threshold score.

13. The computerized system of claim 11, wherein the pre-existing promotional message compares the product or service of the company with the competitor's product or service.

14. The computerized system of claim 11, wherein the instructions further cause the one or more processors to:
receive selection of an option to provide promotional messages based on user sentiment of user posts on competitor webpages.

15. The computerized system of claim 11, wherein the instructions further cause the one or more processors to:
receive identification of one or more competitor webpages that include the competitor's webpage.

16. The computerized system of claim 11, wherein the instructions further cause the one or more processors to:
receive content regarding the product or service of the company; and
wherein the information corresponding with the subject of the negative sentiment is accessed from the content regarding the product or service of the company.

* * * * *